A. BRISBANE.
VEHICLE WHEEL.
APPLICATION FILED MAY 4, 1907.
959,705.
Patented May 31, 1910.
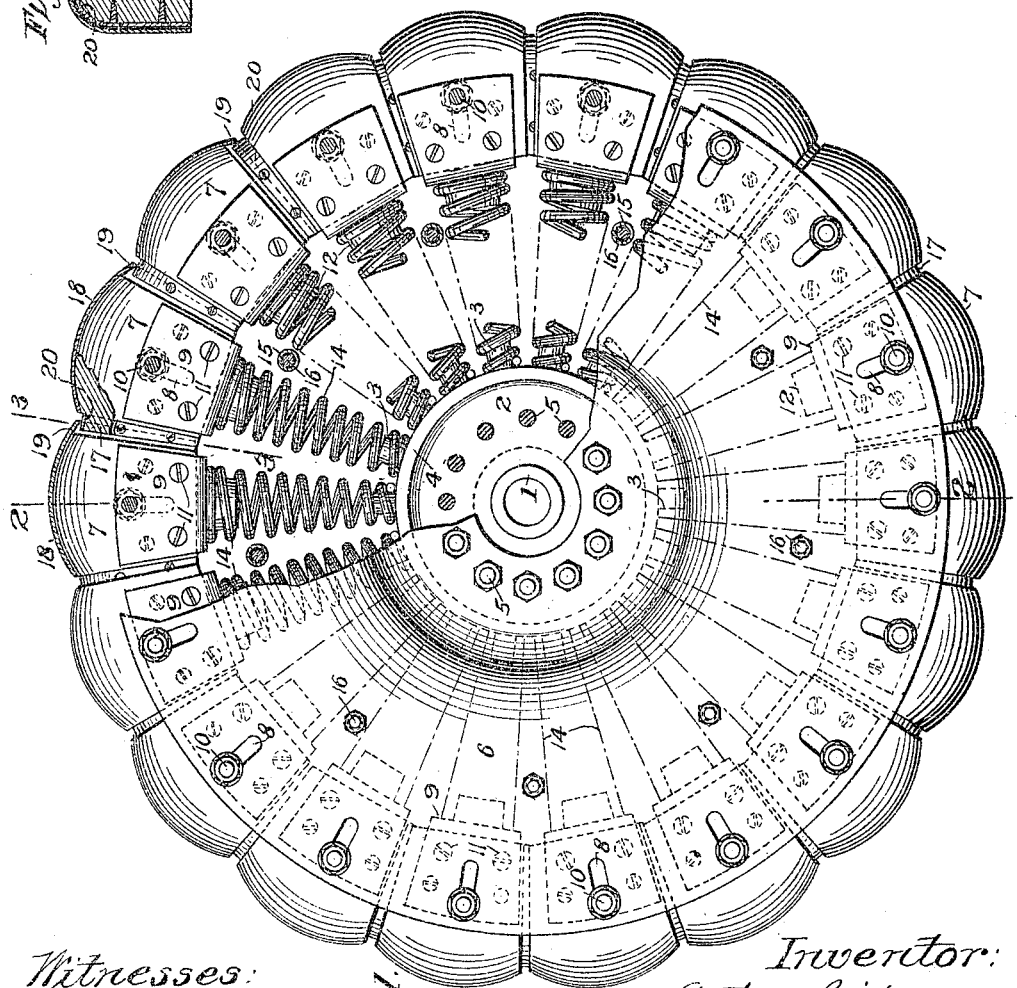

UNITED STATES PATENT OFFICE.

ARTHUR BRISBANE, OF NEW YORK, N. Y.

VEHICLE-WHEEL.

959,705. Specification of Letters Patent. Patented May 31, 1910.

Application filed May 4, 1907. Serial No. 371,871.

*To all whom it may concern:*

Be it known that I, ARTHUR BRISBANE, a citizen of the United States, residing at New York city, county of New York, and State of New York, have invented certain new and useful Improvements in Vehicle-Wheels, fully described and represented in the following specification and the accompanying drawings, forming a part of the same.

This invention relates to improvements in vehicle wheels.

Wheels for motor and like vehicles have been heretofore provided with ordinary pneumatic tires for taking up the shocks caused by any unevenness in the surface over which the vehicle passes. These pneumatic tires are very expensive, both because of the high first cost, and because of their liability to puncture, which renders them useless, and the rapidity with which they wear out.

It is one object of the present invention to produce an improved vehicle wheel for motor vehicles and the like in which the resilient or elastic portion of the wheel is kept out of contact with the surface over which the wheel passes, the resilient portion of the wheel being on the inside of and away from the tread surface of the wheel, so that such part of the wheel, not being subject to direct wear, will maintain its elasticity, and at the same time will not readily wear out.

It is a further object of the invention to provide an improved tread or tread surface for the wheel.

It is a still further object of the invention to produce such a wheel which shall be simple to construct, durable, and the different parts of which, when worn out, may be readily replaced with new parts.

My invention, generally, consists in providing a wheel, the outer or tread surface of which, or that surface which comes in direct contact with the surface over which the wheel travels, consists of a plurality of tread members, these members being of such number and so positioned as to form a practically continuous tread surface around the wheel, these tread members being in contact with a resilient or elastic element located between the said tread members and the hub of the wheel, the tread members being arranged to have certain limited movements with respect to the resilient element, whereby the desired resiliency in the wheel is obtained, the hub also being of an improved construction.

For a full understanding of the invention, a detailed description of the same will now be given with reference to the accompanying drawing, in which—

Figure 1 is a side view, partially in section, of a vehicle wheel embodying my invention, certain parts being broken away for illustrative purposes. Fig. 2 is a vertical section on line 2—2 of Fig. 1. Fig. 3 is a detail view in cross section, the section being taken on line 3—3 of Fig. 1.

Referring now to the drawing, which illustrates the invention in one of its preferred forms, the hub of the wheel is indicated by the numeral 1. This hub carries a metal flange or web 2, which flange, in the best constructions, will be formed integrally with the hub, this construction, securing a very strong wheel. This flange 2 is, as shown, provided with a plurality of projections or lugs 3, the function of which will hereinafter be stated. The flange 2 is, furthermore, formed so that its outer edge, or the edge away from the hub, is rim-shaped, as shown at 4. Secured to this flange in any suitable manner, as by bolts 5, are side plates 6. Two of these side plates are provided for the wheel, one for each side thereof, and each of these side plates extends entirely around the circumference of the wheel. These side plates are toward their inner edges bent inwardly so as to lie in under the rim of the flange 4, being thus held firmly in place. These side plates 6 are of any suitable material. Thin sheet steel is preferably employed, because of its strength. These side plates, in the preferred construction, form the support for tread members 7, and also form a casing in which the elastic or resilient element is positioned, as is hereinafter described. These tread members, which form the tread surface of the wheel, may vary widely in form, construction and in the manner in which they are supported, and may be made of any suitable material, either of wood or metal, or, if desired, rubber, though wood is preferred because of its cheapness and great wearing qualities. In the preferred form, as shown, these tread members are made of wood and are formed with their sides and ends squared and having their outer or tread surfaces rounded, laterally and also circumferentially, so as to give a wavy surface. They may be, however, of any other suitable configuration. As before stated, there is provided a plurality of these tread members.

The particular number of them may vary, but enough will be provided, and they will be set sufficiently close together, to form, in effect, a practically continuous tread surface, and they will be so supported as to have a limited movement toward and away from the resilient or elastic element, as hereinafter described. In the particular construction shown, the plates 6 are slotted or perforated at their outer extremities, as indicated at 8. These members 7 may, if desired, contact directly with the resilient or elastic element but preferably they are, as shown, secured in a holding device or casing 9, one of these holding devices or casings being provided for each of the tread members. This holding device or casing may be made of any suitable material such as thin sheet steel or iron, and is interiorly of the shape of the tread member which is to be held therein, being in the particular construction ⊔-shaped in cross section, the top of the casing being left open so that the end of the tread member may project therefrom.

The holding devices or casings are mounted in the side plates by bolts 10, which pass through the slots 8, the casings thus being permitted to have a radial movement on the bolts in the side plates. The tread members 7 are secured in these casings in any suitable manner, as by screws 11. These casings, furthermore, are, as shown, preferably provided on their inner or lower surface with projections 12, the functions of which will be hereinafter more fully stated. The slots are so positioned in the side plates, and the tread members 7 are of such dimensions, that the upper edges of the tread members, or their tread surface or face, will always project beyond the upper edges of the side plates so that the plates will not come in contact with the surface over which the wheel passes.

As before stated, I provide by my invention a resilient or elastic body or element which is kept out of contact with the surface over which the wheel travels, by the tread members, and with which the tread members coact to produce the resiliency in the wheel. Preferably, this resilient element will include a plurality of tapered steel springs, one of these springs being provided for each one of the tread members. Each one of these steel springs is spiral or helical and is of greater diameter at its upper than at its lower extremity, this material and form of spring being of great durability and resiliency. These spiral or helical steel springs, marked 14, are located or positioned between the flange 2 and the lower or inner surface of the holding devices or casings 9, so that these holding devices come in direct contact with the springs. These springs are securely held in position by the lugs 3 on the flange 2, and by the projections 12 on the holding devices 9, these projections being of sufficient dimensions to hold the springs in place against any ordinary vibration. These springs have a resistance power calculated by the weight of the vehicle on which the springs are to be used, this resistance being calculated so as to give sufficient resiliency and strength.

The side plates 6 between the flange and the holding devices are strengthened and prevented from buckling by spacing sleeves 15, these sleeves being held in position by bolts 16. Means are also preferably provided by the present invention for preventing the entrance of dust and dirt between the tread members. The construction employed for this purpose may be somewhat varied. In the best constructions, and as shown (Fig. 1), the tread members 7 are formed with a shoulder or projection 17, one of these shoulders or projections being formed on one side or end of each member, these shoulders being formed by cutting away the member at the desired point. Each member is covered or sheathed with some durable material, this covering in the particular construction shown being a thin strip of metal 18, secured to the member in any desired manner. This strip of metal covers the tread surface of the member, extending down over the sides thereof below the upper edges of the side plates 6, and projects slightly beyond the top or tread surface and the sides of the member, at the side or end opposite the shoulder, as shown at 19, so that it laps over the shoulder of the next succeeding member and protects the top and side spaces between the members, as clearly shown in Fig. 1. A second narrow strip of metal 20 is bent over the shoulders or projections 17, and extends down over the sides of said shoulders or projections below the upper edges of the side plates, this second strip lying under the first strip on the shoulder, as shown in Fig. 3, and forming a wearing surface on which the strips 18 rub, or wear.

It will be seen that with a wheel constructed in accordance with the foregoing description I have overcome the disadvantages arising from the use of ordinary pneumatic tires, and at the same time have provided a vehicle wheel which will have the desired resilience necessary for motor vehicles and like uses, the necessary strength and the resilient element of which will be practically indestructible, owing to the fact that no direct wear comes on it, and that furthermore I have provided a wheel which is very easily repaired, the tread members being the only parts of the wheel liable to wear out, and these being so constructed and arranged as to be readily removable and easily replaced by new ones.

What I claim is:—

1. In a vehicle wheel, the combination of a plurality of solid tread members forming the tread surface of the wheel, said members forming a practically continuous tread surface, a hub, an annular flange extending radially from the hub, a plurality of projections on the flange, a plurality of holding devices ⊔-shaped in cross section, one for each tread member, each of said holding devices having a projection on its underside, a plurality of springs, one for each tread member, supported by the flange and located between the flange and the holding devices and engaging the projections on the flange and on the holding devices, slotted side plates secured to the flange, and means on the tread members for engaging said slots to limit the movement of said tread members.

2. In a vehicle wheel, the combination of a plurality of solid tread members forming the tread surface of the wheel, a hub, an annular flange extending radially from the hub, a plurality of projections on the flange, a plurality of holding devices ⊔-shaped in cross-section, one for each tread member, means for securing said tread members in the holding devices, a projection on the underside of each of the holding devices, a plurality of tapered helical springs, one for each tread member, supported by the flange, and located between the flange and the holding devices and engaging the projections on the flange and on the holding devices, slotted side plates secured to the flange, and means on the tread members for engaging said slots to limit the movement of said tread members.

In testimony whereof, I have hereunto set my hand, in the presence of two subscribing witnesses.

ARTHUR BRISBANE.

Witnesses:
J. A. GRAVES,
T. F. KEHOE.